United States Patent [19]

Nakanishi

[11] 4,289,297
[45] Sep. 15, 1981

[54] BUTTERFLY VALVE

[75] Inventor: Mikimaro Nakanishi, Yao, Japan

[73] Assignee: Tomoe Technical Research Company, Osaka, Japan

[21] Appl. No.: 138,351

[22] Filed: Apr. 8, 1980

[30] Foreign Application Priority Data

Apr. 20, 1979 [JP] Japan .................................. 54/48042
May 15, 1979 [JP] Japan .................................. 54/58717

[51] Int. Cl.³ ............................................. F16K 1/22
[52] U.S. Cl. ................................................. 251/306
[58] Field of Search ............................... 251/305, 306

[56] References Cited

U.S. PATENT DOCUMENTS

| 3,314,641 | 4/1967 | Overbaugh | 251/148 |
| 3,376,015 | 4/1968 | Forsman et al. | 251/306 |
| 3,840,208 | 10/1974 | Schudel et al. | 251/306 |
| 4,014,511 | 3/1977 | Uno | 251/306 |
| 4,025,050 | 5/1977 | Manki et al. | 251/306 |

FOREIGN PATENT DOCUMENTS

| 2503727 | 8/1976 | Fed. Rep. of Germany ...... 251/306 |
| 37-7035 | 8/1962 | Japan . |
| 38-3964 | 3/1963 | Japan . |
| 38-15276 | 7/1963 | Japan . |
| 39-6928 | 5/1964 | Japan . |
| 42-10311 | 6/1967 | Japan . |
| 43-24219 | 10/1968 | Japan . |
| 45-34 | 1/1970 | Japan . |
| 45-13307 | 5/1970 | Japan . |
| 1299508 | 12/1972 | United Kingdom ................ 251/306 |
| 1320125 | 6/1973 | United Kingdom ................ 251/306 |

Primary Examiner—Martin P. Schwadron
Assistant Examiner—H. Jay Spiegel
Attorney, Agent, or Firm—Wegner & Bretschneider

[57] ABSTRACT

A butterfly valve comprising a valve body, a disk-shaped valve member pivotally provided on the valve body, and a seat ring fixed to the valve body, the seat ring having a circumferential protrusion on an inner surface thereof.

6 Claims, 9 Drawing Figures

BUTTERFLY VALVE

The present invention relates to a butterfyl valve adapted to extremely decrease in amount of torque required for rotation of the valve member in opening or shutting fluid path defined by the valve body by means of the valve member.

It is well known that a butterfly valve has an annular seat ring made of elastic material such as rubber adapted to be disposed between an inner surface of an annular valve body and a circumference of a disk-shaped valve member for sealing action by pressing the circumference of the valve member on the inner surface of the seat ring in shutting the fluid path defined by the valve member.

However, such a type of butterfly valve has a disadvantage that since in rotating a valve member for opening or shutting a fluid path the valve member is rotated intruding itself onto the surface of the seat ring in the neighborhood of the shutting position, relatively large amount of acting torque is required to rotate the valve member even in the neighborhood of a shutting position, resulting in hindering quick action of the valve member when the valve member is operated with a drive means of small amount of output torque and in necessity of a driving means of large capacity, on the contrary, when a drive means of large amount of output torque is adopted for quick operation of opening and shutting the fluid path, and, in addition, another disadvantage that unnecessarily intruding itself onto the seat ring each time of opening and shutting makes the seat ring worn out with result of shortening life of the valve.

In order to avoid such disadvantages, improvements have been proposed such that a seat ring of narrow width is provided on the inner surface of the valve body so that the circumference of the valve member is pressed on the seat ring only when the valve member is rotated at the utterly shutting position of the fluid path, or the seat ring is provided with an inwards projecting annular protrusion of the inner surface thereof. For example, in order to keep amount of torque necessary to rotate the valve member as small as possible, a type of butterfly valve has been proposed such that the seat ring is provided with a convex protrusion extending circumferentially along the inner surface of the seat ring, a part of the circumference of the valve member does not contact the seat ring depending on an angle of rotation of the valve member during rotation of the valve member, and the total circumference of the valve member is touched on said convex protrusion with predetermined pressure at the utterly shutting position.

However, also in a type of butterfly valve with the seat ring, for example, having the convex protrusion, the protrusion is formed to have a certain width, since the circumference of the valve member affects sealing action by intruding to a certain extent into the convex protrusion of the seat ring arranged in the valve body, so that, for instance, when the valve member is rotated from a state of full opening toward a state of full shutting, a portion of the circumference of the valve member in the neighborhood of the valve stem coming into contact with the convex protrusion of the seat ring before other portions, thereafter the valve member is required to be rotated against braking action of the seat ring made of rubber or the like with result of necessitating it to be applied relatively larger amount of rotating torque in order to be brought into a state of full shutting. In addition, when a hydraulic cylinder, an electric motor or the like is used for drive means to rotate the valve member, it is an important factor to decrease in necessary amount of rotation torque for making dimension of the drive means to be decreased and ensuring the action thereof, consequently instead of uniformly intruding the valve member on the convex protrusion the valve member is pressed on the convex protrusion to the extent of obtaining a predetermined shutting condition of fluid path. However, even in managing to try in such a way as abovementioned, the drive means results in carrying an excess load.

It is an object of the present invention to provide a butterfly valve to enable to decrease necessary amount of torque to rotate a valve member in the neighborhood of full shutting, when a disk-shaped valve member opens or shuts a fluid path defined by an annular valve member.

It is another object of the present invention to provide a butterfly valve being free from influence affected on a seat ring by a valve member for preventing a seat ring from being deteriorated, in rotating the valve member.

It is a further object of the present invention to provide a butterfly valve to enable the drive means to decrease in necessary output to rotate the valve member and to enable the drive means to be constructed in small size and economically.

It is still another object of the present invention to provide a freely adjustable butterfly valve capable of setting at an optimum sealing condition independent of degree of wear in a seat ring.

It is still further object of the present invention to provide a butterfly valve capable of opening and shutting fluid path relatively quickly.

In order to attain above-mentioned objects, the present invention provides a butterfly valve comprising an annular valve body, a disk-shaped valve member pivotally provided on the annular valve body so as to open and shut the fluid path defined by the annular valve body, and a seat ring having a sealing surface disposed between the valve body and the valve member so as to make sure to shut the fluid path by means of the valve member, the sealing surface of the seat ring being shaped to become wider as it is circumferentially far from a position around the axis of rotation of the valve member.

Next, a preferable embodiment of the present invention is explained referring to drawings, which will make objects, characteristics, and still further objects and characteristics of the present invention more definite.

Figure 1:
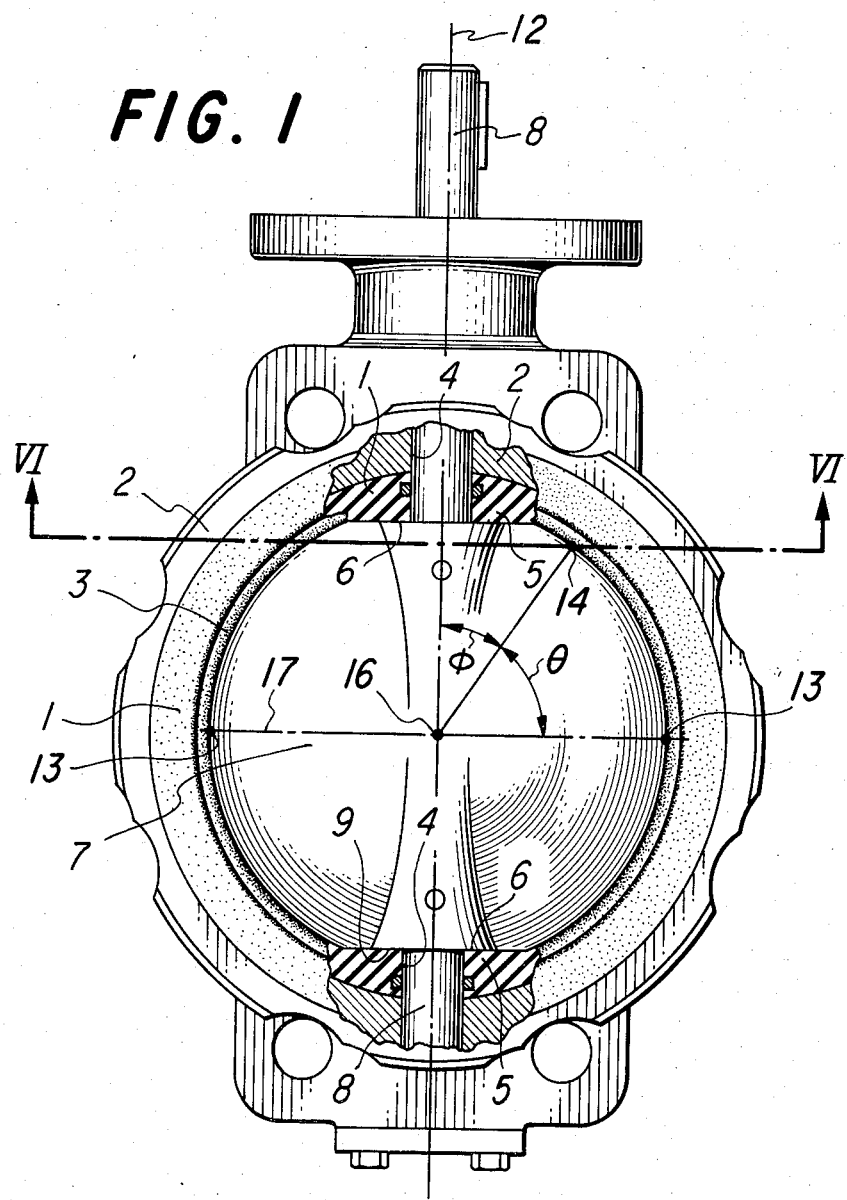
FIG. 1 is a front view of an embodiment of a butterfly valve according to the present invention, showing that fluid path is shut by a valve member.
Figure 2:
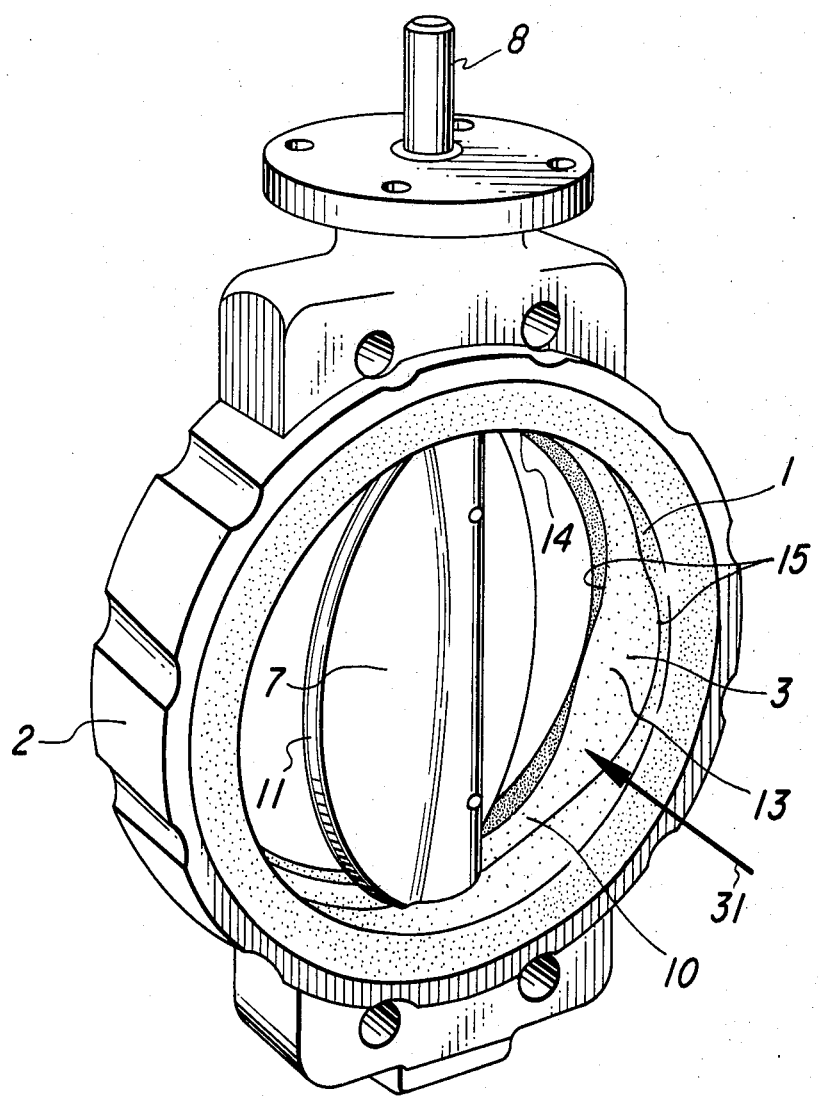
FIG. 2 is a perspective view of a butterfly valve in FIG. 1, showing that fluid path is a little opened.
Figure 3:
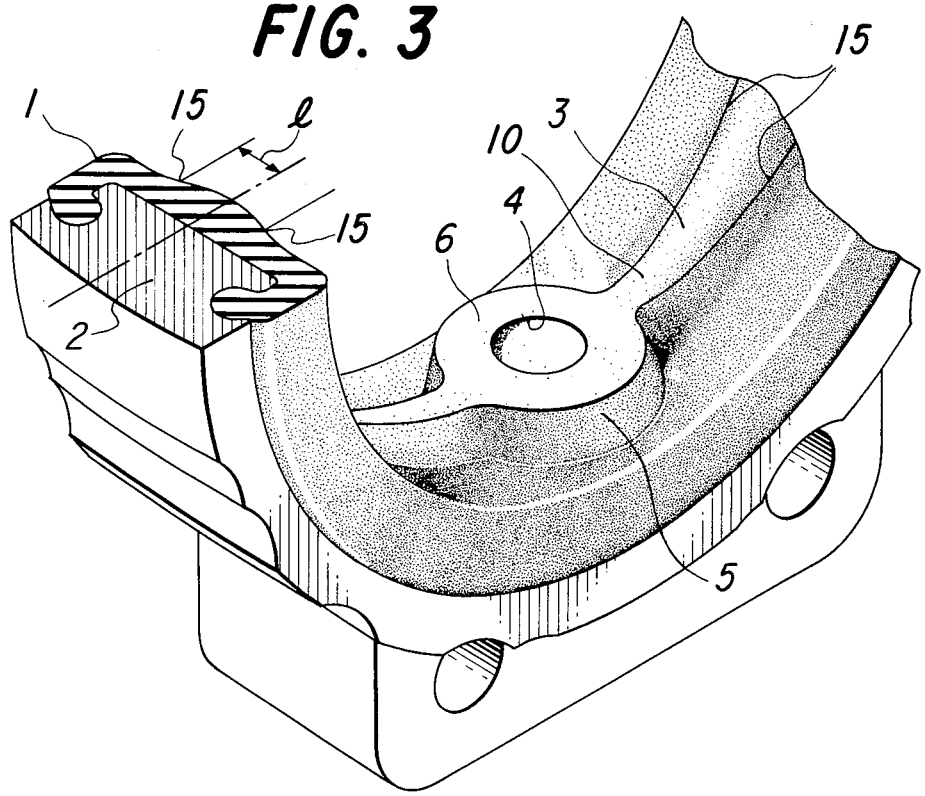
FIG. 3 is a particularly detailed drawing of a valve member and a seat ring in a butterfly valve illustrated in FIG. 1.
Figure 9:
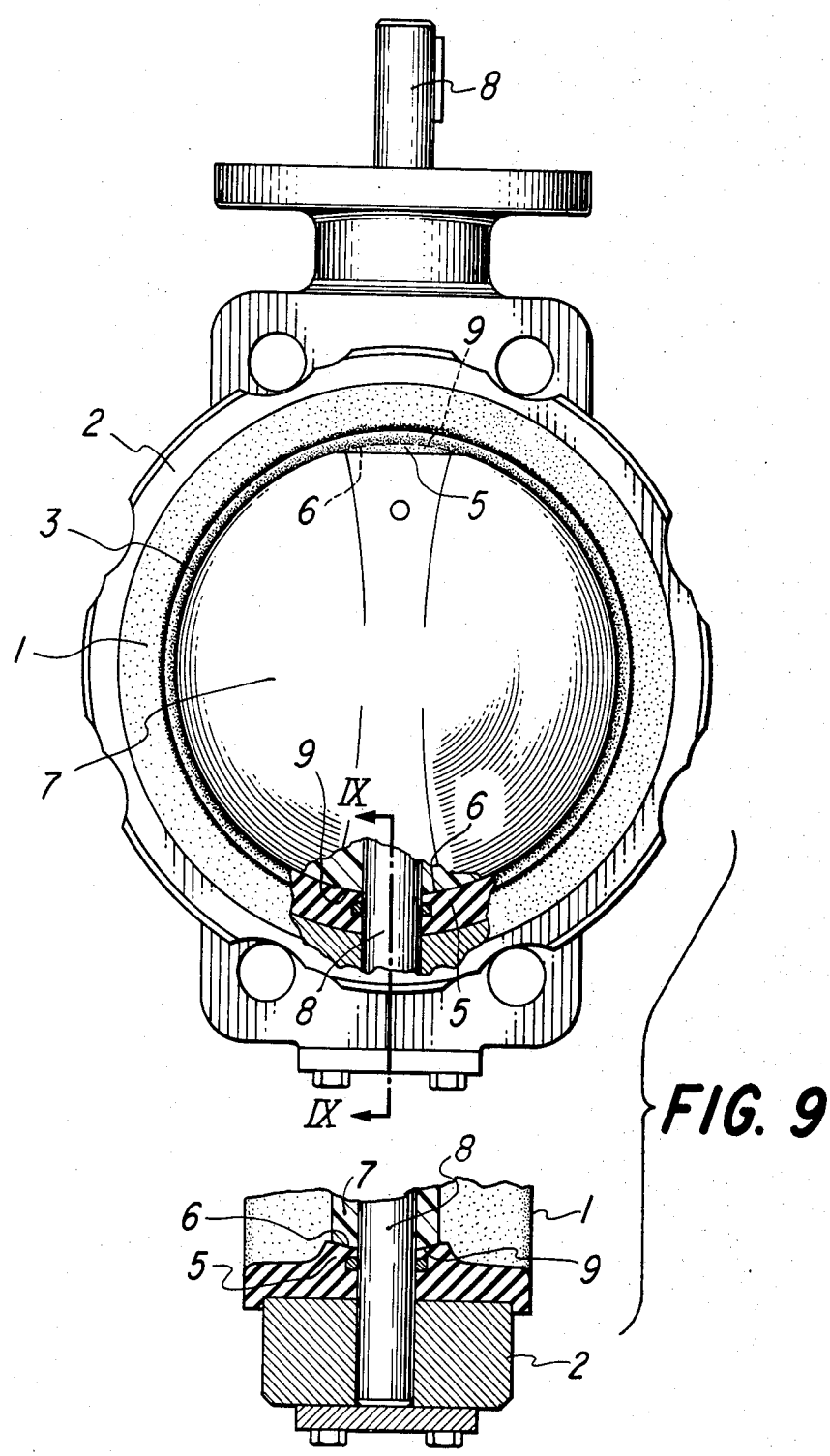
FIG. 9 is a front view and a IX—IX sectional view of still further embodiment of a seat ring and a valve member.

In FIGS. 1 to 3, an annular valve body 2 made of rigid material is lined with a ring-shaped valve seat 1 of elastic material such as rubber on an inner circumferential surface and side surface. The seat 1 provided with a protrusion 3 integrally formed along circumference thereof is fitted with the valve body 2, having annular protrusions 5 formed at a pair of locations opposed each other and shaped to have a hole 4 substantially positioned at the center thereof as well as to be connected with the protrusion 3. The hole 4 penetrates the seat 1, extending into the valve body 2. The upper face 6 of the annular protrusion 5 is shaped even to form a sliding surface, and the hole 4 is inserted with a valve stem 8 fixed to the valve member 7 made of rigid material for function of bearing against the stem 8. The upper face 6 of the protrusion 5 may be shaped to a concave as shown in FIG. 9. In the circumference of the disk-shaped valve member 7 in the neighborhood of the stem 8 is formed an annular flat surface 9, which slides in contact with the upper face 6 of the annular protrusion 5 in rotating the valve member 7, and substantially from the center of which the stem 8 is protruding. In the embodiment of FIG. 9 the sliding surface 9 is formed with a convexity.

The upper surface 10 of the circumferential protrusion 3, functioning as a sealing surface, is pressed on the circumference 11 of the valve member 7, when it is set at a position illustrated in FIG. 1 after rotation, so as to ensure the valve member 7 to shut fluid path 31 defined by the valve body 2. And the sealing surface 10 is formed to have larger width circumferentially in accordance with being far from the neighborhood of the center line 12 of rotation of the valve member 7, that is a line connecting two centers of a pair of holes 4. That is to say, the protrusion 3 is shaped to have a smooth profile 15, the width of which becomes gradually narrower from a position 13 farthest from rotation axis 12 through an intermediate position 14 to a hole 4.

Figure 4:
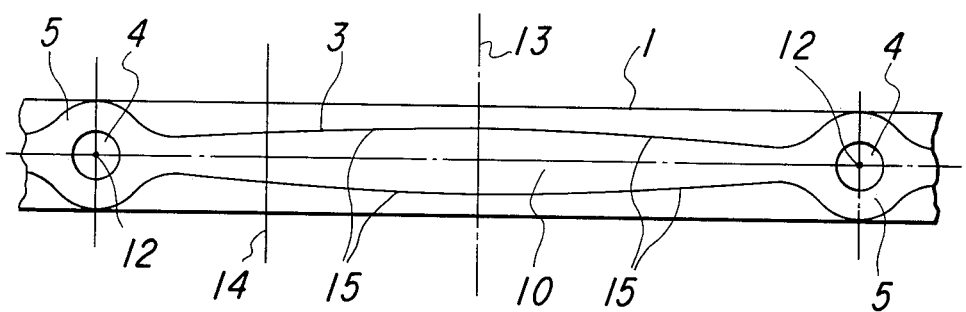
FIG. 4 is a developed drawing of a half of circumference of a seat ring illustrated in FIG. 1.

FIG. 4 shows a plan of a developed seat ring 1, where the median between a pair of holes 4 coincides with the position 13 contacting with the sealing surface 10 into the valve member 7 on the horizontal line 17 perpendicular to the center line 12 through the center 16 of the valve member 7. As shown in FIG. 4, the convex protrusion 3 of the seat ring 1 is shaped to be widest at the position 13 and to become narrower on both sides nearer the holes 4.

Figure 5:
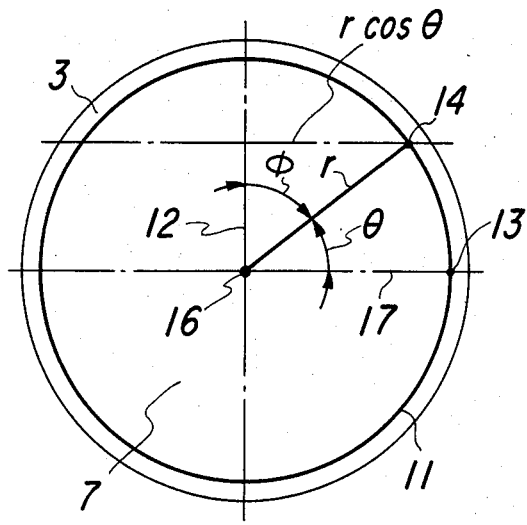
FIG. 5 is a diagrammatic drawing of a butterfly valve illustrated in FIG. 1, showing relation of contact between a valve member and a protrusion of a seat ring.
Figure 6:
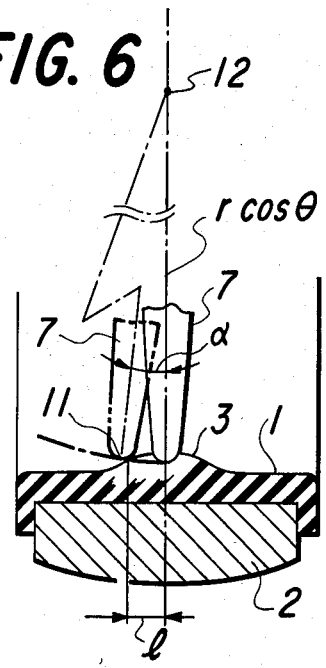
FIG. 6 is a cross-sectional view through a line VI—VI in a butterfly valve illustrated in FIG. 1.

Now a preferable shape of the profile 15 defining this convex protrusion 3 will be explained referring to FIGS. 5 and 6. For simplifying the description, the valve member substantially does not have thickness. FIG. 5 is a diagrammatic drawing of a valve member 7 and a protrusion 3 seen from the same direction as FIG. 1, and as definitely shown in this drawing, a radius of rotation of the valve member 7 at the position 14 containing an angle $\theta$ at the center 16 with the line 17 perpendicular to the center line 12 of rotation is $r \cos \theta$, wherein r is radius of the valve member 7. On the other hand, FIG. 6 is a cross-sectional drawing showing two positions which the valve member 7 takes when rotated from a position of open toward a position of shutting, in one position the circumference 11 of the valve member 7 being touched on the protrusion 3 of the seat ring 1 from the position 12 to the position 14, and in another position all of the circumference 11 of the valve member 7 being located in the middle of the protrusion 3 of the seat ring 1. As obvious in FIG. 6, when an angle between the valve member 7 in a case of the circumference 11 thereof being touched on the protrusion 3 to position 14 and the valve member 7 in a case of the circumference 11 being located in the middle of the protrusion 3 of the seat ring 1 is presented by $\alpha$, and a distance from the center of the circumference 11 of the valve member 7 in a case of touching the protrusion 3 to the center of the protrusion 3 is presented by l, considering that the radius of rotation of the circumference 11 in the position 14 is $r \cos \theta$, the following relation is obtained:

$$l = r \cos \theta \cdot \sin \alpha = (r \sin \alpha) \cos \theta$$

and hence the distance l may be written in cosine function.

That is to say, by choosing cosine curve as the profile 15 defining the edge on both longitudinal sides along the convex protrusion 3 shown in FIG. 4, the circumference 11 of the valve member 7 can be touched or detached substantially at one time in relation to the protrusion 3 of the seat ring 1 in accordance with rotation of the valve member 7, whereby the valve member 7 can be rotated with relatively small amount of rotating torque.

Actually, the profile 15 can be occasionally set apart from the cosine curve, depending on dimension of the valve, thickness of the circumference 11 of the valve member, protruding amount of the convex protrusion 3 of the seat ring 1, or a sectional shape of the protrusion 3 (arcuate, triangular, of frustum-shaped), accordingly the profile 15 can be modified in many ways. In all cases, the profile 15 is fundamentally a function of the angle $\theta$, for example a trigonometric function. And also in the case where the thickness of the circumference 11 of the valve member is fixed in all the circumference, all parts of the profile 15 are not necessary to be formed in cosine curve but only a part of the profile 15 may be of cosine curve or all of the profile may be formed in a curve corresponding to cosine curve. Further, if all of the profile 15 is formed in cosine curve, the width l of the convex protrusion 3 in the neighborhood of the hole 4 becomes too narrow to be fabricated with sufficient strength of material itself of the seat ring, with sufficient durability or with adequately prepared molding dies, wherefrom it is unnecessary to give all of the profile 15 a cosine curve.

An influence of a touching portion of the circumference 11 to the seat ring 1 affecting amount of torque is examined.

At a position 14 in FIG. 1, frictional force per unit length between the seat ring 1 and the valve member 7 is presented by f, and the radius of the valve member 7 is presented by r, then a frictional force per unite minute length at a position 14 having angle $\phi$ with the center line 12 turns out to be $f \cdot r \cdot \Delta \phi$, and torque applied to the valve stem 8 for rotating the valve member 7 against this frictional force is $r \cdot \sin \phi \cdot f \cdot r \cdot \Delta \phi$. Integrating this from 0° to φ, total torque Ts can be got by simple calculation to be $$Ts \alpha (1 - \cos \phi)$$

Then the total torque from φ=0 to φ=90° being taken as unit, torque ratios for several values of φ are as follows:

| | |
|---|---|
| φ = 0° | torque ratio = 0 |
| φ = 0° to 30° | torque ratio = 0.13 |
| φ = 0° to 45° | torque ratio = 0.3 |
| φ = 0° to 60° | torque ratio = 0.5 |
| φ = 0° to 90° | torque ratio = 1.0 |

As obvious from above-mentioned figures, 70% of the total torque is loaded in a range of φ from 45° to 90°. Consequently from practical point of view the profile 15 of the sealing surface 10 on the protrusion 3 from φ=45° to 90°, preferably from φ=30° to 90° is sufficient to be curved or preferably cosine-curved.

Figure 7:
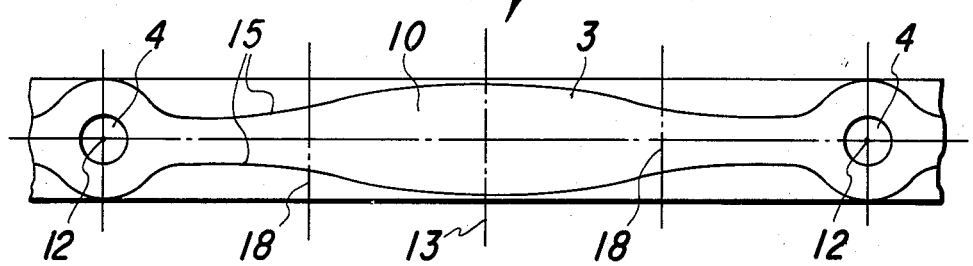
FIG. 7 is a developed drawing of another embodiment of a seat ring, showing a half of circumference of a butterfly valve according to the present invention.

FIG. 7 shows another embodiment of the present invention having above-mentioned construction, and between the hole 4 and the position 13 the seat ring 71 has a position 18 defined corresponding to φ=45° (it is easily understood that the position 18 becomes the median of the hole 4 and the position 13), and the portion of the sealing surface 10 on the protrusion 3 between the two positions 18 including the position 13 has a curved profile in the same way as in the first embodiment, and the other portion of the sealing surface 10 is constructed with a straight profile.

By taking a form of seat ring 71, concurrently with that substantially the same functional effect as in the case of the seat ring 1 is attainable, the width of the protrusion 3 in both of the neighborhood of the valve stem 8 can be taken as longer as possible than a theoretical figure for avoiding insufficient mechanical intensity of the seat ring in the neighborhood of the valve stem and an increase in cost of dies for molding the seat ring.

As explained above, by using a seat ring 1 or 71, the circumference 11 of the valve member 7 is adapted at first to touch the lower portion of the convex protrusion 3 of the seat ring substantially at the one time and gradually to extrude itself onto the seat ring depending on rotation of the valve member 7 with result of increasing in tightness effect. Consequently, in opening or shutting the valve member may be stopped after being rotated to a position where sealing action is sufficiently affected in accordance with fluid pressure in the fluid path, which enables the output torque required for the drive means to be suppressed to minimum torque.

Further, even when the seat ring 1 is worn out, the valve member 7 can be adjusted to be stopped at a position of the convex protrusion 3 higher than a position of stop defined conventionally, so that uniform strength in tightness is obtainable for a long time with result of ensuring long life of the valve.

Though in above-mentioned embodiments, the convex protrusion of the seat ring is shaped arcuate in the cross-section protruding inwards as shown in FIG. 3 or 6, the present invention is applicable to a protrusion, for example, having shape of frustrum or triangle straightly tapered on both sides in cross-section. In addition, the shape of the seal ring itself may be circular, multi-angular, elliptical, or frustrum-shaped and the present invention is able to be applied to these various kinds of shaped of the seat ring.

Figure 8:
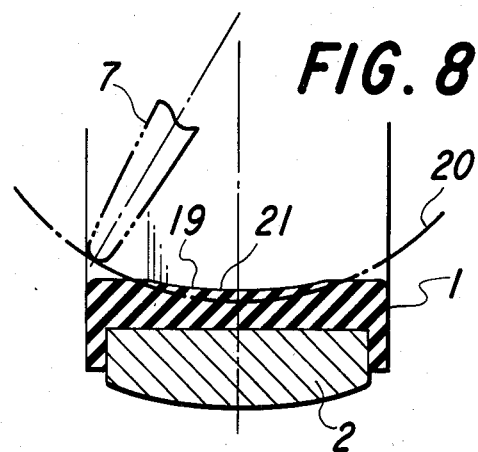
FIG. 8 is a cross-sectional drawing of still another embodiment of a seat ring through a line VI—VI in FIG. 1 in the same way as FIG. 6, showing that a sealing surface is defined by a concave surface.

Further, the sealing surface of the seat ring 1 may be shaped into an annular concave or groove 19, which is narrow in width at the neighborhood of the valve stem 12, as shown in FIG. 8, and in this case the same effect is able to be obtained as the protrusion 3 by adequately determining a locus of an arbitrary position of the circumference 11 of the valve member 7 and curvature of said concave 19. Such concave sealing surface 21 results in extending the range of adjustable angle for sealing pressure by means of angle of the valve member.

Though in above-mentioned embodiments, a type of butterfly valve having a valve stem 8 penetrating a seat ring, so-called central type, is explained, the present invention is similarly applicable to a type of eccentric butterfly valve, which has a seat ring holding a perfectly uniform cross-sectional form all over the circumference. Further, the present invention is similarly applicable to a type of butterfly valve having a valve member equipped with an elastic seat ring around circumference thereof, or to a type of butterfly valve having a seat ring integrally on a valve member or a valve body, or in addition, to a type of butterfly valve having a seat ring of metal.

As above-mentioned, according to the present invention, since in rotation of a valve member circumference of a valve member begins to touch and intrude a seat ring all over the circumference substantially at one time, rotating torque of the valve member can be decreased as much as possible, and necessary rotating torque can be also decreased since an optimum seal characteristic can be set up by regulating the shutting position of the fluid path of the valve member.

During rotation of a valve member, the valve member is protected from being intruded excessively onto a seat ring, and is able to extend life of the seat ring. Moreover, cost-down can be attained by decreasing in size of drive means disposed outside the valve because of decreasing in rotating torque.

What is claimed is:

1. A butterfly valve comprising:
   an annular valve body,
   a disk-shaped valve member having a rotation axis and pivotally mounted on said annular valve body at each end of said rotation axis to open or shut a fluid path defined by said annular valve body, and
   a seat ring having an annular sealing surface disposed between said valve body and said valve member to ensure shutting of the fluid path by said valve member,
   said sealing surface having two first surfaces each being in the vicinity of the corresponding end of said rotation axis and two second surfaces each extending from one of said first surfaces to the other first surface, each of said second surfaces having substantially a maximum width in the middle position between said first surfaces, the width of each of said second surfaces gradually enlarging from the position adjacent to said first surfaces to said middle position of the said second surface wherein peripheral edges formed on each side of each second surface define said width, said peripheral edges each having a curve defined with a part of a trigonometric function.

2. A butterfly valve as claimed in claim 1, wherein said seat ring is formed with an annular protrusion, the surface of said annular protrusion being adapted to define said sealing surface.

3. A butterfly valve as clamed in claim 1, wherein said seat ring is formed with an annular groove, the surface of said annular groove being adapted to define said sealing surface.

4. A butterfly valve as claimed in any one of claims 1-3, wherein said trigonometric function is a cosine defined between −60 degrees and +60 degrees.

5. A butterfly valve as claimed in any one of claims 1 to 3, wherein said valve member is supported by said valve body through a valve stem, said seat ring having holes receiving said valve stem at positions at the ends of the rotation axis.

6. A butterfly valve as claimed in claim 1, wherein the seat ring is fixed with said valve body.

* * * * *